United States Patent
Ho et al.

(10) Patent No.: US 10,231,028 B1
(45) Date of Patent: *Mar. 12, 2019

(54) METHOD AND SYSTEM TO DISTRIBUTE CONSUMER VIDEO OVER TELEVISION NETWORK

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,327

(22) Filed: Jun. 17, 2012

Related U.S. Application Data

(63) Continuation of application No. 11/776,521, filed on Jul. 11, 2007, now Pat. No. 8,230,469.

(51) Int. Cl.
*H04N 21/61* (2011.01)
*H04N 21/472* (2011.01)
*H04N 21/6408* (2011.01)
*H04N 21/8352* (2011.01)
*H04N 7/173* (2011.01)
*H04L 29/06* (2006.01)

(52) U.S. Cl.
CPC ..... *H04N 21/6408* (2013.01); *H04L 65/4076* (2013.01); *H04L 65/4084* (2013.01); *H04N 21/6175* (2013.01); *H04N 21/8352* (2013.01); *H04N 21/47208* (2013.01)

(58) Field of Classification Search
None
See application file for complete search history.

(56) References Cited

U.S. PATENT DOCUMENTS

| | | | | |
|---|---|---|---|---|
| 5,734,719 A | * | 3/1998 | Tsevdos et al. | 725/109 |
| 6,101,535 A | * | 8/2000 | Hussmann et al. | 709/217 |
| 7,458,092 B1 | * | 11/2008 | Parker | H04N 21/2747 725/120 |
| 7,647,614 B2 | * | 1/2010 | Krikorian | H04N 21/4398 725/110 |
| 2002/0144262 A1 | * | 10/2002 | Plotnick et al. | 725/32 |
| 2002/0184629 A1 | * | 12/2002 | Sie et al. | 725/41 |

(Continued)

FOREIGN PATENT DOCUMENTS

WO   WO 9731476 A1 * 8/1997 ............... G09G 5/00

*Primary Examiner* — Fernando Alcon
(74) *Attorney, Agent, or Firm* — North Shore Patents, P.C.; Michele Liu Baillie

(57) ABSTRACT

A method and system for immediate distribution of a purchased consumer video includes an online video portal, which includes a video receiver and a video server. The video receiver connects to the online video merchant over a video distribution network and receives a consumer video from an online video merchant. The consumer video is purchased by a consumer from the online video merchant over a commerce network. The video receiver stores the consumer video in a consumer datastore. The video server connects to a television set of the consumer over a dedicated television channel of a television network. The video server retrieves the stored consumer video from the consumer datastore and sends the consumer video to a television set of the consumer over a dedicated television channel. The consumer video is distributed immediately after the consumer video is received from the online video merchant and stored in the consumer datastore.

21 Claims, 8 Drawing Sheets

(56) References Cited

U.S. PATENT DOCUMENTS

| | | | |
|---|---|---|---|
| 2004/0199497 A1* | 10/2004 | Timmons | 707/3 |
| 2005/0028208 A1* | 2/2005 | Ellis | H04N 7/163 |
| | | | 725/58 |
| 2005/0044560 A1* | 2/2005 | Kryeziu | 725/14 |
| 2006/0123455 A1* | 6/2006 | Pai | H04N 7/17318 |
| | | | 725/133 |
| 2008/0127275 A1* | 5/2008 | Tang et al. | 725/56 |
| 2009/0213268 A1* | 8/2009 | Huang | H04N 5/46 |
| | | | 348/552 |
| 2011/0197159 A1* | 8/2011 | Chaganti et al. | 715/781 |

* cited by examiner

METHOD AND SYSTEM TO DISTRIBUTE CONSUMER VIDEO OVER TELEVISION NETWORK

CROSS-REFERENCE TO RELATED APPLICATIONS

The present application is a continuation of co-pending U.S. patent application entitled "Method and System to Distribute Consumer Video Over Television Network", Ser. No. 11/776,521, filed on Jul. 11, 2007, and is related to U.S. patent application entitled "Method and system to Distribute Online Video", Ser. No. 11/743,558, filed on May 2, 2007.

BACKGROUND OF THE INVENTION

Field

This invention relates generally to television, particularly to a system and method to distribute purchased consumer video over a television network.

Related Art

Television set is often the centerpiece of a living room. With a good quality television set equipped with a DVD player, a consumer can enjoy home theatrical experience emulating that of a cinema. In addition to broadcast programs, the consumer can also enjoy pay-per-view and video-on-demand programs.

But nothing rivals the wide selection of purchased and rental movies, as evident by the continuous success they enjoy. With the advent of the Internet, many merchants are deploying innovative ways to deliver movies to enthusiasts. For example, NetFlix™ offers online movie rental and delivers the movies via postal service. Motivated by the success of online music download, some e-commerce merchants such as Walmart.com™, Amazon.com™ and iTunes™ are trotting out movie download purchase.

Online movie download from e-commerce merchants provides the convenience of not having to leave home. Unfortunately, the current solution does not allow the consumer to enjoy the movie immediately after a purchase. This is unacceptable in light of the fast-pace and on-the-go lifestyle of modern day living.

In one example, Iris buys the newly released "Dreamgirl" movie from an online e-commerce store. The movie is 142 minutes long and it takes almost 5 hours to download. After the download, Irish has to transfer the movie to a DVD disk or to her Apple™ TV so that she can play the movie on her television set. She is dismayed to find out that the whole process is so tedious and takes such a long time.

In one example, Tina and Mike decide to watch a movie after dinner at home. They check online movie merchant Amazon.com™ and select a movie they like. Unfortunately, they are told by Amazon.com™ to wait for 20 minutes before the movie can be shown. They cannot watch the movie on television right away.

In one more example, Greg enjoys watching streaming videos from the Internet. However, Greg finds the viewing experience for streaming videos at high resolution unacceptable with frequent delays, interruptions or choppiness of the picture.

The above illustrates a need for a system and method for immediate distribution of purchased consumer video over a television network to a television set.

BRIEF SUMMARY OF THE INVENTION

A method and system for immediate distribution of a purchased consumer video includes an online video portal, which includes a video receiver and a video server. The video receiver connects to the online video merchant over a video distribution network and receives a consumer video from an online video merchant. The consumer video is purchased by a consumer from the online video merchant over a commerce network. The video receiver stores the consumer video in a consumer datastore. The video server connects to a television set of the consumer over a dedicated television channel of a television network. The video server retrieves the stored consumer video from the consumer datastore and sends the consumer video to a television set of the consumer over a dedicated television channel. The consumer video is distributed immediately after the consumer video is received from the online video merchant and stored in the consumer datastore.

DETAILED DESCRIPTION OF THE INVENTION

Figure 1:
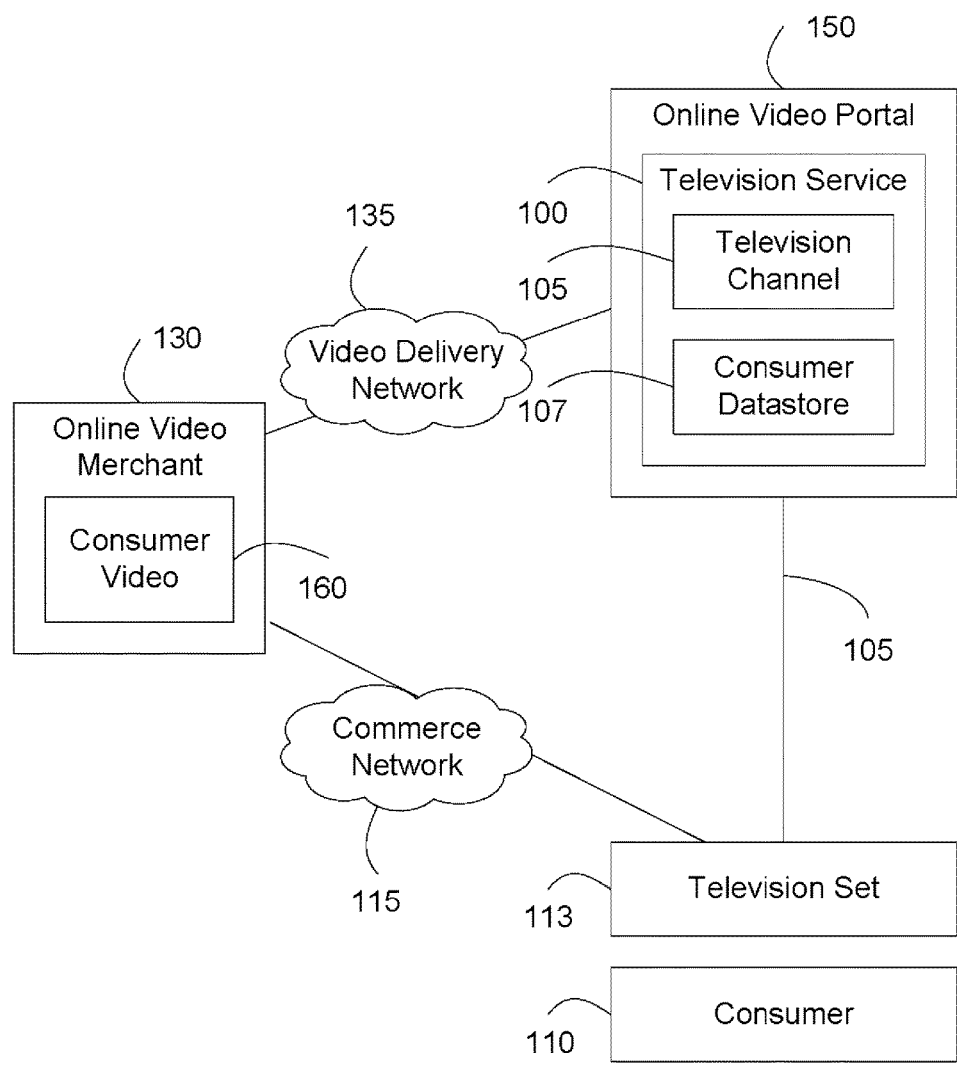
FIG. 1 illustrates a television service distributing a purchased consumer video for immediate viewing.

FIG. 1 illustrates a television service distributing a purchased consumer video for immediate viewing.

Online video portal 150 offers a television service 100 to consumer 110. Consumer 110 purchases a consumer video 160 from an online video merchant 130. Television service 100 allows consumer 110 to store consumer video 160, to watch consumer video 160 immediately after the consumer video 160 purchase, and to watch consumer video 160 at a later time after the purchase. In a preferred embodiment, online video merchant 130 operates independently from online video portal 150. In one embodiment, online video merchant 130 is a different business entity from online video portal 150.

Television service 100 includes a dedicated television channel 105. Television service 100 distributes consumer video 160 over television channel 105. Consumer 110 has a television set 113. Consumer 110 tunes television set 113 to television channel 105 to view consumer video 160.

The dedicated television channel 105 does not include transmissions over the Internet. In one embodiment, television channel 105 is a cable television channel. In one embodiment, television channel 105 is a broadcast channel from a Direct Broadcast Satellite (DBS). In one embodiment, television channel 105 is an Internet Protocol Television (IPTV) channel.

In one embodiment, television set 113 includes a set top box. In one embodiment, television set 113 includes a satellite television receiver.

Consumer video 160 includes video and audio content. In one embodiment, consumer video 160 is a movie or a television program. In one embodiment, consumer video 160 is an animation, or a documentary. In one embodiment, consumer video 160 is an instructional video for health and fitness, cooking or tennis. In one embodiment, consumer video 160 is a short video clip. In one embodiment, consumer video 160 is a sport event or beauty pageant production. In one embodiment, consumer video 160 is an opera or play performance. In one embodiment, consumer video 160 is a musical video, or an e-learning/training video. In one embodiment, consumer video 160 is encoded in Moving Pictures Expert Group v2.0 (MPEG-2) format. In one embodiment, consumer video 160 is encoded in MPEG-1 or MPEG-4 format. In one embodiment, consumer video 160 is included in a media container, such as Audio Video Interleave (AVI), Flash Video (FLV) or QuickTime MOV container.

Television service 100 distributes consumer video 160 at a digital television quality. In one embodiment, the digital television quality is Standard Definition Television (SDTV) quality, High Definition Television (HDTV) quality, or Enhanced Definition Television (EDTV) quality.

Television service 100 distributes consumer video 160 immediately so as to allow consumer 110 to watch consumer video 160 immediately after the consumer video 160 purchase. For example, consumer 110 begins watching 3 seconds, 5 seconds or 8 seconds after completing the purchase.

Television service 100 further allows consumer 110 to watch consumer video 160 at a later time after the purchase. For example, a week or an hour after the consumer video 160 purchase, consumer 110 tunes television set 113 to television channel 105, and watches consumer video 160.

Consumer 110 purchases consumer video 160 from online video merchant 130 over commerce network 115. As used herein, a purchase is understood to include renting, leasing, loaning and licensing consumer video 160 from online video merchant 130. In one embodiment, commerce network 115 includes the Internet; consumer 110 purchases consumer video 160 at an electronic commerce (e-commerce) portal operated by online video merchant 130. In one embodiment, television set 113 connects to commerce network 115; consumer 110 uses television set 113 to purchase consumer video 160 from online video merchant 130. In one embodiment, commerce network 115 includes a telephone network; consumer 110 purchases consumer video 160 over a telephone call to online video merchant 130.

Online video portal 150 receives consumer video 160 from online video merchant 130 over video delivery network 135. In one embodiment, video delivery network 135 is based on Internet Protocol (IP). In one embodiment, video delivery network 135 includes an enterprise data network, a virtual Private Network (VPN), or an Extranet. An embodiment of the video delivery network 135 is described in co-pending U.S. patent application entitled, "Method and System to Distribute Online Video", Ser. No. 11/743,558, filed on May 2, 2007. This application is hereby incorporated by reference in its entirety.

Television service 100 includes a consumer datastore 107 for storing consumer video 160. In one embodiment, consumer datastore 107 includes a hard disk with capacity of, for example, 100 gigabytes, 500 gigabytes or 1 terabytes. In one embodiment, consumer datastore 107 includes a database.

Online video portal 150 distributes consumer video 160 signals over television channel 105. Television set 113 tunes to television channel 105 to receive consumer video 160 signals.

Figure 2:
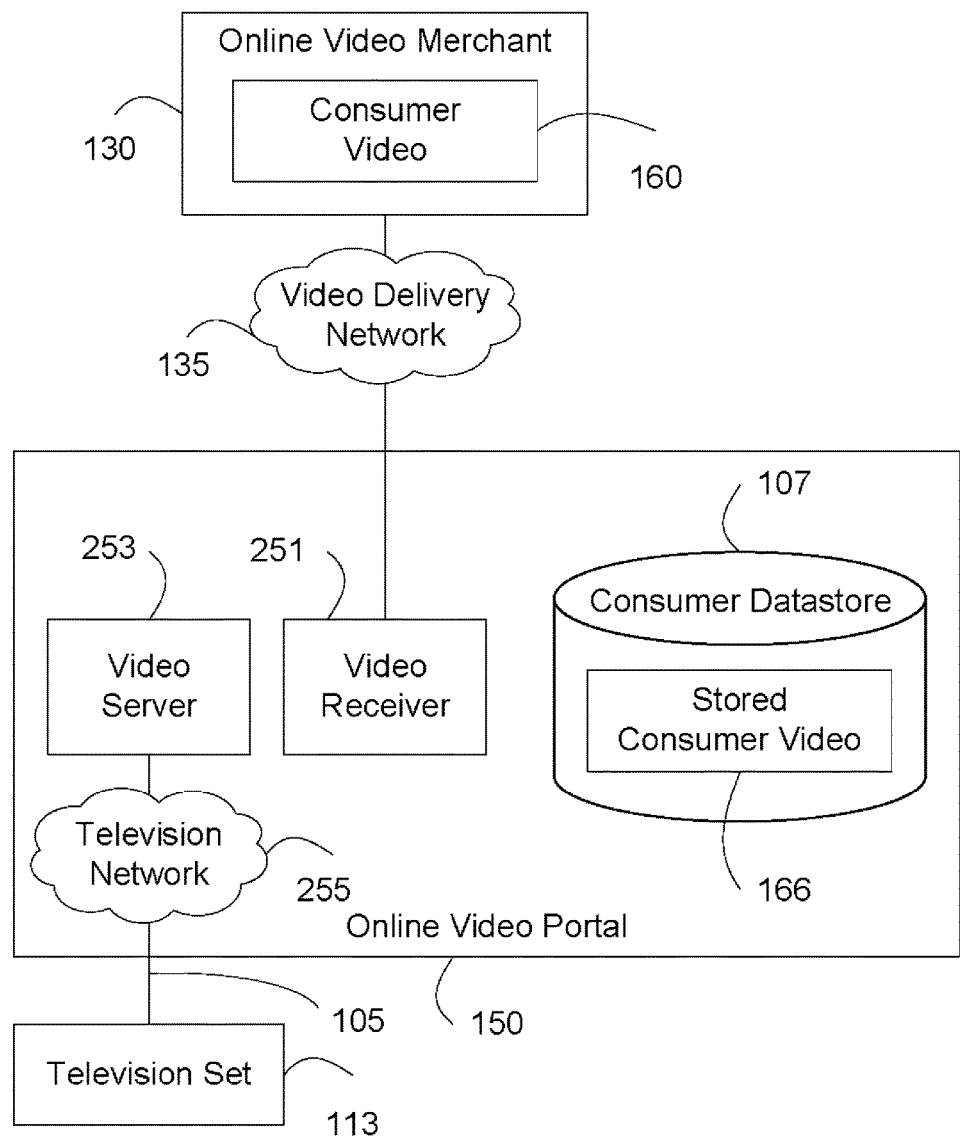
FIG. 2 illustrates an online video portal.

FIG. 2 illustrates an online video portal.

Online video portal 150 includes video receiver 251. Video receiver 251 connects to online video merchant 130 over video delivery network 135. Video receiver 251 receives consumer video 160 from online video merchant 130 over video delivery network 135.

Online video portal 150 includes consumer datastore 107. Video receiver 251 stores consumer video 160 as stored consumer video 166 in consumer datastore 107. In one embodiment, consumer video 160 and stored consumer video 166 have the same format. In one embodiment, consumer video 160 and stored consumer video 166 have different formats.

Online video portal 150 includes video server 253. Video server 253 connects to television network 255. Television network 255 includes television channel 105. Video server 253 distributes stored consumer video 166 onto television channel 105 over television network 255.

In one embodiment, video receiver 251 receives consumer video 160 at a speed faster than the speed video server 253 distributes stored consumer video 166.

In one embodiment, video server 253 connects to television network 255 over an Ethernet. In one embodiment, video server 253 connects to television network 255 over an optical data network.

Television network 255 connects to television set 113. In one embodiment, television network 255 includes a cable television network, or a satellite television network. In one embodiment, television network 255 includes an Internet Protocol television (IPTV) network. In one embodiment, television network 255 includes a multi-service operator (MSO) network. In one embodiment, television network 255 includes a direct broadcast satellite (DBS) network. In one embodiment, television network 255 is a private network operated by or for a hotel, a hospital, a vacation resort, a rehabilitation center or a cruise ship. In one embodiment, television network 255 is operated by or for a multi-tenant apartment complex, a business park, or a housing community. In one embodiment, television network 255 is operated by or for a corporation.

Figure 6:
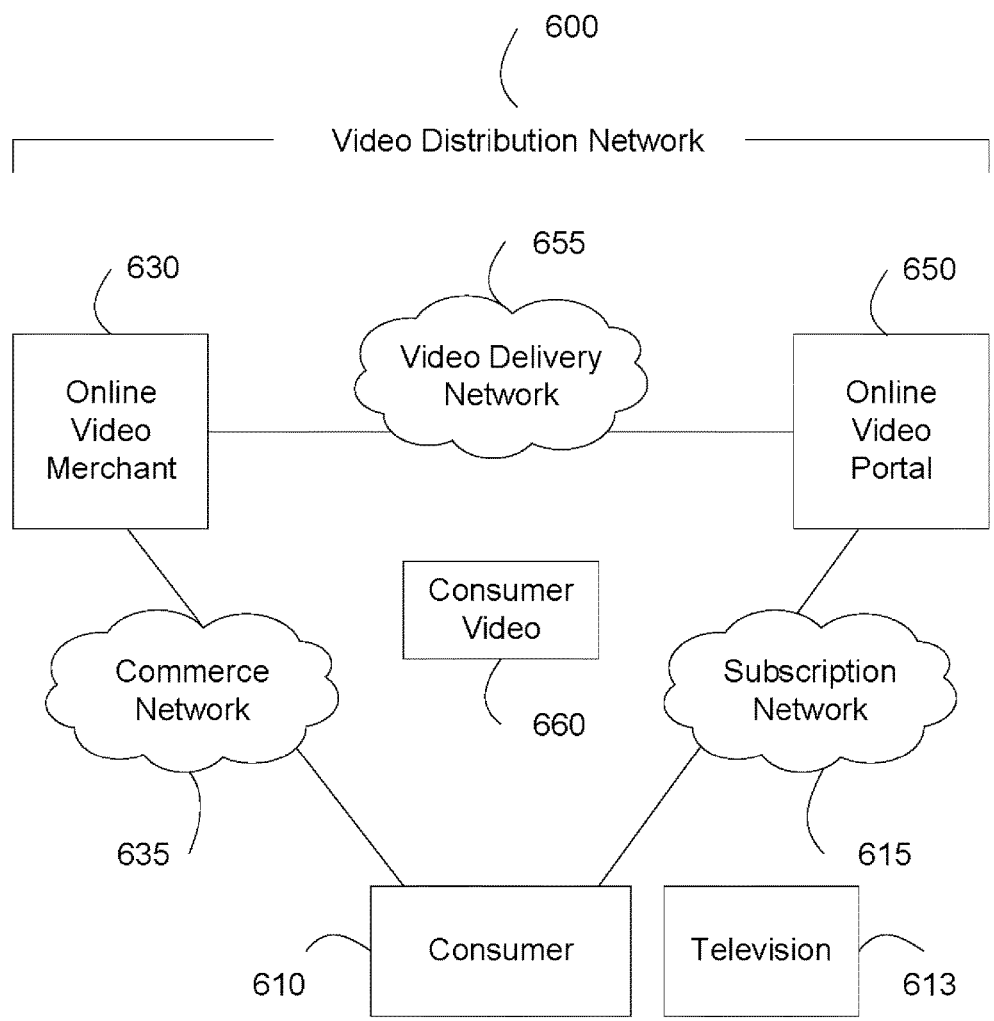
FIG. 6 illustrates an online video distribute network for consumer viewing.

FIG. 6 illustrates an online video distribution network for consumer viewing. Online video distribution network 600 includes online video portal 650. Consumer 610 subscribes to online video portal 650. The subscription allows consumer 610 to access consumer video 660 over subscription network 615. Consumer video 660 belongs to consumer 610. The access includes viewing consumer video 660.

In one embodiment, subscription network 615 includes a cable television network. In one embodiment, subscription network 615 includes a satellite television network. In one embodiment, subscription 615 includes an Internet Protocol television (IPTV) network. In one embodiment, subscription network 615 includes a mobile television network based on, for example, MediaFlow, Digital Video Broadcasting Handheld (DVB-H) or Digital Multimedia Broadcasting (DMB) technology. In one embodiment, subscription network 615 includes the Internet. In one embodiment, subscription network includes a telephone network. Consumer 610 views consumer video 660 using a television 613 connected to subscription network 615.

Consumer 610 orders consumer video 660 from online video merchant 630 over commerce network 635 and requests online video merchant 630 to deliver consumer video 660 to online video portal 650. In one embodiment, the order is for rental of consumer video 660. In another embodiment, the order is for purchase of consumer video 660.

In one embodiment, commerce network 635 includes the Internet; consumer 610 orders consumer video 660 at an electronic commerce (e-commerce) portal operated by online video merchant 630. In one embodiment, commerce network 635 includes a telephony network, such as Public Switched Telephone Network (PSTN), or a public Voice over IP (VoIP) telephone network. Consumer 610 orders consumer video 660 over a telephone call to online video merchant 630. Online video merchant 630 delivers consumer video 660 to online video portal 650 over video delivery network 655.

Figure 7:
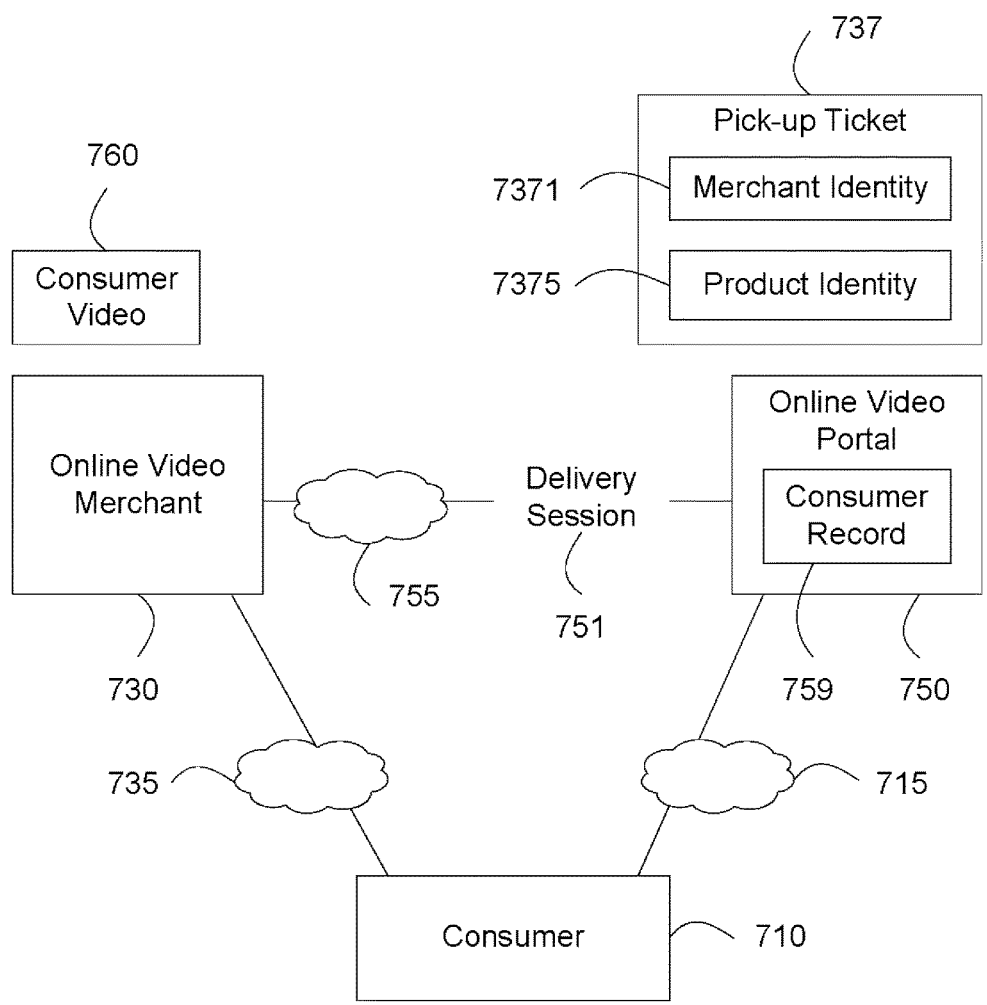
FIG. 7 illustrates an online consumer video order delivery using a pick up ticket.

FIG. 7 illustrates an online consumer video order delivery using a pick up ticket. Consumer 710 subscribes to online video portal 750. Online video portal 750 includes a consumer record 759 associated with consumer 710. Consumer 710 orders consumer video 760 from online video merchant 730 over commerce network 735 and requests online video merchant 730 to deliver consumer video 760 to online video portal 750.

Online video merchant 730 provides a pick-up ticket 737 to consumer 710 over commerce network 735. Pick-up ticket 737 includes merchant identity 7371 of online video merchant 730 and product identity 7375 of consumer video 760. Consumer 710 provides pick-up ticket 737 to online video portal 750 over subscription network 715. Online video portal 750 uses pick-up ticket 737 to pick up consumer video 760 for consumer 710.

In one embodiment, merchant identity 7371 includes a Web address or a Uniform Resource Locator (URL). Online video portal 750 connects to online video merchant 730 using the Web address. In one embodiment, merchant identity 7371 includes a name of online video merchant 730. Online video portal 750 obtains a Web address based on the name. In one embodiment, online video portal 750 obtains the Web address by matching the name against a lookup table, or by querying a database. In one embodiment, online video portal 750 and online video merchant 730 has an Extranet connection. Merchant identity 7371 includes information for connecting to online video merchant 730 via the Extranet. Online video portal 750 connects to online video merchant 730 via the Extranet.

In one embodiment, online video portal 750 establishes a delivery session 751 with online video merchant 730 over video delivery network 755. Online video portal 750 provides product identity 7375 to online video merchant 730 over delivery session 751. In one embodiment, product identity 7375 includes a Universal Product Code (UPC). In one embodiment, product identity 7375 includes an International Standard Audiovisual Number (ISAN). In one embodiment, product identity 7375 includes a merchandise number, a product tracking number or an inventory number. In one embodiment, product identity 7375 includes a title of consumer video 760. In one embodiment, product identity 7375 includes a product tracking number specific to online video merchant 730, such as Amazon Standard Identification Number (ASIN). In one embodiment, product identity 7375 is associated with an order transaction record for consumer video 760. In one embodiment, delivery session 751 includes an HTTP session; online video portal 750 provides product identity 7375 over the HTTP session.

Online video merchant 730 uses product identity 7375 to retrieve consumer video 760. Online video merchant 730 sends consumer video 760 to online video portal 750 over delivery session 751. In one embodiment, delivery session 751 includes a file transfer session wherein online video merchant 730 sends consumer video 760 over the file transfer session. In one embodiment, the file transfer session is based on File Transfer Protocol (FTP), FTP over Secure Shell (SSH), or FTP/SSL technology. In one embodiment, delivery session 751 includes an HTTP session wherein online video merchant 730 sends consumer video 760 as entity body over the HTTP session. In one embodiment, delivery session 751 is based on Web Service technology. In one embodiment, delivery session 751 is based on cXML, or e-business XML (ebXML) technology. Online video portal 750 receives consumer video 760 and stores consumer video 760 in consumer record 759.

Figure 8:
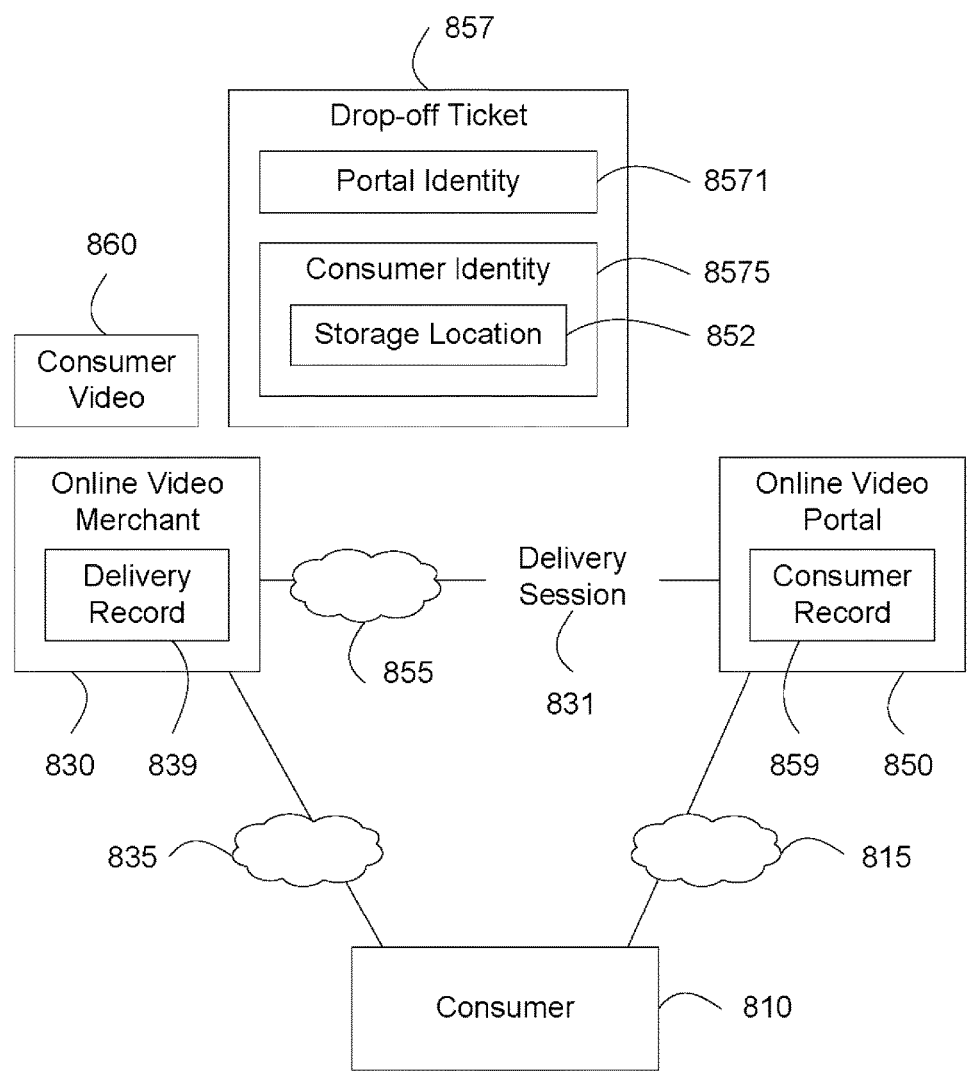
FIG. 8 illustrates a process to deliver an online consumer video order using a drop off ticket.

FIG. 8 illustrates a process to deliver an online consumer video order using a drop off ticket. Consumer 810 subscribes to online video portal 850. Online video portal 850 includes a consumer record 859 associated with consumer 810. Consumer 810 orders consumer video 860 from online video merchant 830 over commerce network 835 and requests online video merchant 830 to deliver consumer video 860 to online video portal 850.

Consumer 810 obtains a drop-off ticket 857 from online video portal 850 over subscription network 815. Drop-off ticket 857 includes portal identity 8571 of online video portal 850 and consumer identity 8575 of consumer 810. In one embodiment, consumer 810 specifies a storage location 852 wherein online video portal 850 includes storage location 852 in consumer identity 8575. In one embodiment, storage location 852 includes a folder name.

Consumer 810 provides drop-off ticket 857 to online video merchant 830 over commerce network 835. Online video merchant 830 stores drop-off ticket 857. In one embodiment, online video merchant 830 stores drop-off ticket 857 in a delivery record 839 associated with consumer video 860.

Online video merchant 830 uses delivery record 839 to drop off consumer video 860.

In one embodiment, portal identity 8571 includes a Web address or a Uniform Resource Locator (URL). Online video merchant 830 connects to online video portal 850 using the Web address. In one embodiment, portal identity 8571 includes a name of online video portal 850 and online video merchant 830 obtains a Web address based on the name. In one embodiment, online video merchant 830 obtains the Web address by matching the name against a lookup table, or by querying a database. In one embodiment, online video merchant 830 and online video portal 850 has an Extranet connection and portal identity 8571 includes information for connecting to online video portal 850 via the Extranet. Online video merchant 830 connects to online video portal 850 via the Extranet.

In one embodiment, online video merchant 830 establishes a delivery session 831 with online video portal 850 over video delivery network 855. Online video merchant 830 provides consumer identity 8575 to online video portal 850 over delivery session 831. In one embodiment, delivery session 831 includes an HTTP session; online video merchant 830 provides consumer identity 8575 over the HTTP session.

Online video merchant 830 sends consumer video 860 to online video portal 850 over delivery session 831. In one embodiment, delivery session 831 includes a file transfer session wherein online video merchant 830 sends consumer video 860 over the file transfer session. In one embodiment, the file transfer session is based on FTP/SSH, or FTP/SSL technology. In one embodiment, delivery session 831 is based on cXML, or E-Business XML (ebXML) technology. In one embodiment, delivery session 831 is based on Web Service technology.

Online video portal 850 receives consumer video 860 and consumer identity 8575. Online video portal 850 determines consumer record 859 based on consumer identity 8575. Online video portal 850 stores consumer video 860 in consumer record 859. In one embodiment, consumer identity 8575 includes storage location 852. Online video portal 850 stores consumer video 860 in storage location 852.

Figure 3:
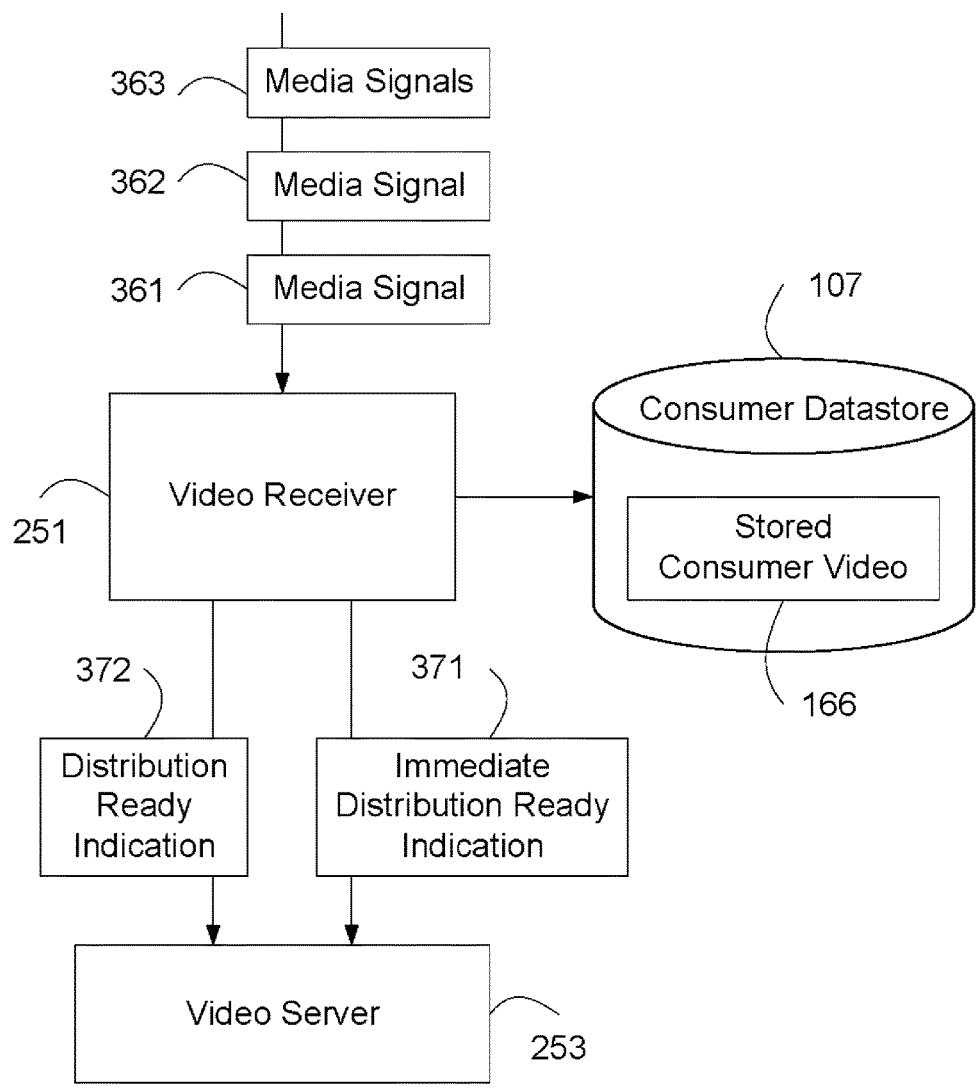
FIG. 3 illustrates a process for receiving a consumer video.

FIG. 3 illustrates a process for receiving a consumer video.

Video receiver 251 receives consumer video 160 from online video merchant 130. Video receiver 251 stores consumer video 160 as stored consumer video 166 in consumer datastore 107. While video receiver 251 receives consumer video 160, video receiver 251 indicates that stored consumer video 166 is ready to be distributed immediately. In one embodiment, video receiver 251 additionally indicates that stored consumer video 166 is ready to be distributed anytime.

In one embodiment, video receiver 251 receives consumer video 160 as a sequence of media signals. Video receiver 251 stores the received sequence of media signals as sequence of media data in stored consumer video 166. In one embodiment, stored consumer video 166 is stored in consumer datastore 107. Video receiver 251 receives a first media signal 361. Media signal 361 corresponds to a beginning portion of consumer video 160. In one embodiment, media signal 361 corresponds to the first 500 milliseconds, 1 second or 5 second of consumer video 160. In one embodiment, media signal 361 corresponds to the first 30, 100, or 200 MPEG-2 frames of consumer video 160. In one embodiment, media signal 361 is related to the difference in the receiving speed of video receiver 251 and the distributing speed of video server 253. In one embodiment, the receiving speed is 12 Mbps and the distributing speed is 12 Mbps. In one embodiment, media signal 361 corresponds to 5 seconds of consumer video 160.

In an embodiment, the receiving speed is faster than the distributing speed. Media signal 361 is related to the initial distributing buffering need of video server 253. In one embodiment, the initial distribution buffering need is 5 Kb. In one embodiment, the initial distribution buffering needs is 6 MPEG-4 frames. In one embodiment, media signal 361 is related to the initial buffering need for media codec conversion.

In another embodiment, receiving media signal 361 indicates a successful communication session establishment between video receiver 251 and online video merchant 130. In one embodiment, the successful communication session establishment includes authentication, sending and receiving speed negotiation, and media format negotiation.

In yet another embodiment, media signal 361 is related to a time duration where video server 253 inserts an advertisement. In one embodiment, video server 253 inserts a 30-second advertisement. In one embodiment, media signal 361 corresponds to 30 seconds of consumer video 160.

Video receiver 251 stores media signal 361 in stored consumer video 166. After video receiver 251 receives media signal 361, video receiver 251 indicates that stored consumer video 166 is ready for immediate distribution. In one embodiment, video receiver 251 sends an immediate distribution ready indication 371 to video server 253. In one embodiment, immediate distribution ready indication 371 includes the location of stored consumer video 166 in consumer datastore 107. In one embodiment, video receiver 251 stores immediate distribution ready indication 371 in stored consumer video 166.

Video receiver 251 receives a second media signal 362 after media signal 361. Media signal 362 corresponds to another portion of consumer video 160.

Video receiver 251 stores media signal 362 in stored consumer video 166. In one embodiment, after video receiver 251 receives second media signal 362, video receiver 251 indicates that stored consumer video 166 is ready to be distributed anytime. In one embodiment, video receiver 251 determines the stored consumer video 166 is ready to be distributed anytime when error or missing media data in the stored consumer video 166 is below a predetermined threshold based on the desired display quality. In one example, the threshold is 0.01%, 0.2% or 1%. In one example, video receiver 251 determines after the stored consumer video 166 reaches 50% of consumer video 160. In one embodiment, video receiver 251 sends a distribution ready indication 372 to video server 253. In one embodiment, video receiver 251 stores distribution ready indication 372 in stored consumer video 166.

In one embodiment media signal 362 corresponds to the last portion of consumer video 160. In one embodiment, video receiver 251 receives the remaining media signals 363 of consumer video 160. Video receiver 251 stores media signals 363 in stored consumer video 166.

Figure 4:
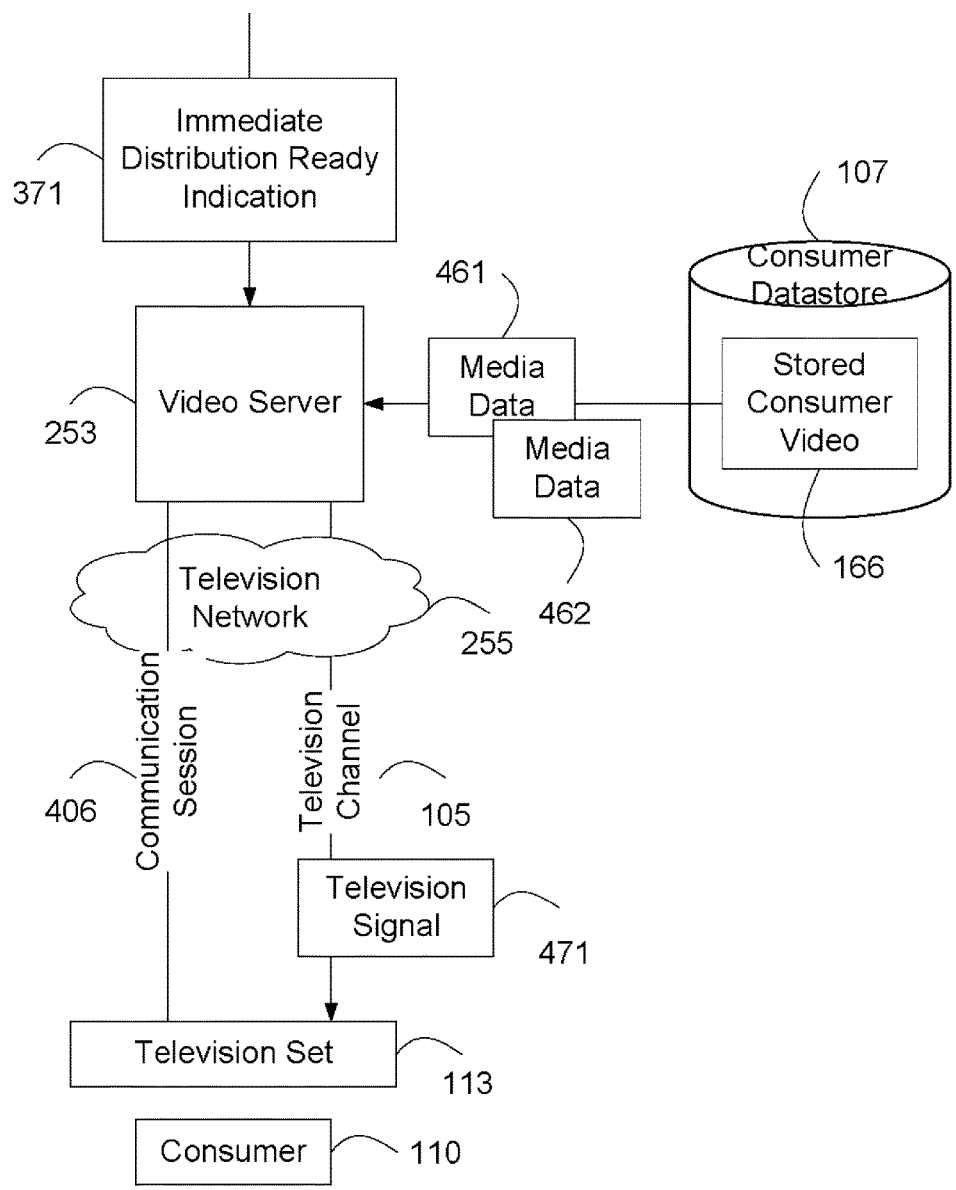
FIG. 4 illustrates a process to distribute a stored consumer video immediately.

FIG. 4 illustrates a process to distribute a stored consumer video immediately.

Video server 253 receives immediate distribution ready indication 371 from video receiver 251. In one embodiment, video server 253 obtains the location of stored consumer video 166 from immediate distribution ready indication 371. Video server 253 then retrieves stored consumer video 166 and distributes stored consumer video 166 to television set 113 immediately. In one embodiment, the location includes a file system directory path, or a file system folder reference. In one embodiment, the location includes a Universal Resource Locator (URL). In one embodiment, the location includes a query key to a database.

Video server 253 retrieves a sequence of media data from stored consumer video 166. Video server 253 converts the sequence of media data to television signals and distributes television signals onto television channel 105 of television network 255. In one embodiment, video server 253 retrieves media data 461. Video server 253 converts media data 461 to television signal 471. In one embodiment, the conversion includes media codec conversion, such as conversion to MPEG-2 format. In one embodiment, the conversion includes amplitude modulation, frequency modulation, frequency division multiplexing, audio or video codec conversion, or other technologies known to the skill in the art. In one embodiment, television signal 471 is in National Television Standards Committee (NTSC) format. In one embodiment, television signal 471 is in Phase Alternation Line (PAL) format. In one embodiment, television signal 471 is in Advanced Television Systems Committee (ATSC) format.

In one embodiment, video server 253 transmits television signal 471 over a Quadrature Amplitude Modulation (QAM) channel to provide HDTV video quality. The QAM channel corresponds to television channel 105. In another embodiment, video server 253 transmits over a QAM sub-channel to provide SDTV video quality. In one embodiment, video server 253 transmits over a DBS frequency band that corresponds to television channel 105. In one embodiment, video server 253 transmits over an IPTV session.

After processing media data 461, video server 253 proceeds to retrieve next media data 462 from stored consumer video 166.

In one embodiment, video server 253 detects an error while retrieving media data 461. In one scenario, video receiver 251 has not received media signal 361 corresponding to media data 461 from online video merchant 130. In one scenario, video receiver 251 did not receive media signal 361. In another scenario, video receiver 251 detects an error in receiving media signal 361 and does not store media data 461 in stored consumer video 166.

In one embodiment, video server 253 performs error handling for the media data 461. In one embodiment, video server 253 transmits previously transmitted media data. In one embodiment, video server 253 transmits a previously transmitted MPEG-2 frame. In another embodiment, video server 253 transmits an MPEG-2 frame that represents a blue or a snow image. In an embodiment, video server 253 transmits an error-indication image.

In one embodiment, after handling the media data 461 error scenario, video server 253 retrieves next media data 462.

In one embodiment, after completing the consumer video 160 purchase, consumer 110 tunes television set 113 to television channel 105. Television set 113 receives television signal 471 from video server 253. Television set 113 processes and displays television signal 471.

In one embodiment, television set 113 automatically tunes to television channel 105. In one embodiment, video server 253 establishes a communication session 406 with television set 113 over television network 255. After receiving immediate distribution ready indication 371, video server 253 instructs television set 113 to tune to television channel 105 over communication session 406. In one embodiment, video server 253 instructs before distributing stored consumer video 166. In one embodiment, video server 253 instructs 2 seconds, 3 seconds or 5 seconds after video server 253 after starting to distribute stored consumer video 166.

In one embodiment, communication session 406 is based on Internet Protocol (IP). In one embodiment, communication session 406 is based on Web technologies. In one embodiment, communication session 406 is based on Remote Method Invocation (RMI) or other proprietary technologies.

Figure 5:
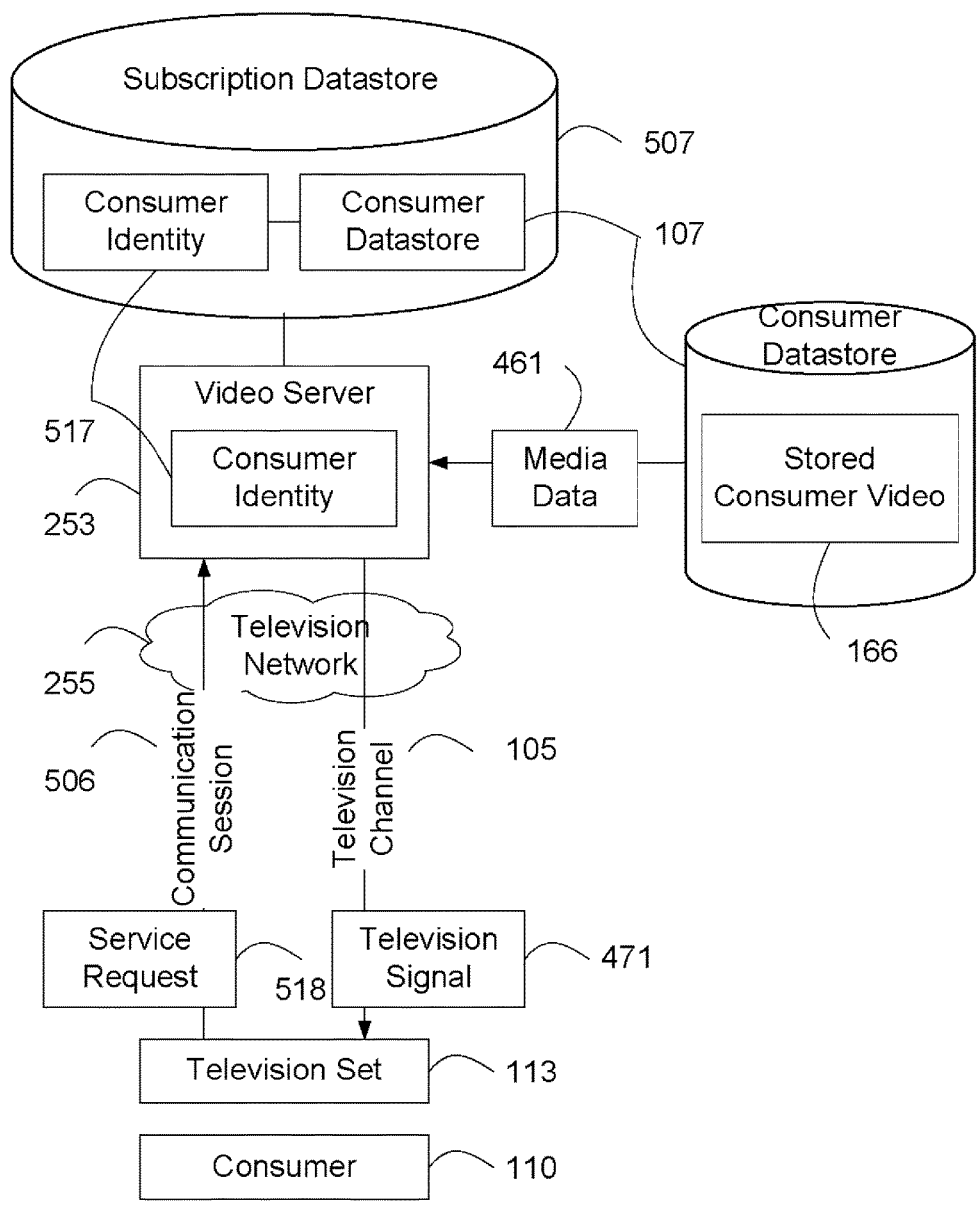
FIG. 5 illustrates a process to distribute stored consumer video at a later time.

FIG. 5 illustrates a process to distribute stored consumer video at a later time.

At some time after the consumer video 160 purchasing, such as an hour, 2 hours or 4 days later, consumer 110 instructs television set 113 to tune to television channel 105.

Television set 113 establishes a communication session 506 with video server 253, and sends a service request 518 to video server 253 over communication session 506.

Video server 253 obtains consumer identity 517 from television set 113. In one embodiment, service request 518 includes consumer identity 517. In one embodiment, consumer identity 517 includes a device identity such as a serial number of television set 113. In one embodiment, video server 253 authenticates consumer identity 517 by asking consumer 110 to enter a user name or a pin code.

Video server 253 locates consumer datastore 107 based on consumer identity 517. In one embodiment, video server 253 connects to a subscription datastore 507. Subscription datastore 507 includes consumer identity 517 associated with consumer datastore 107 location. Video server 253 matches consumer identity 517 against subscription datastore 507 and retrieves consumer datastore 107 location. Video server 253 accesses consumer datastore 107.

Video server 253 access stored consumer video 166 in consumer datastore 107. In one embodiment video server 253 determines that stored consumer video 166 is not ready to be distributed anytime based on distribution ready indication 372. In one embodiment, stored consumer video 166 includes distribution ready indication 372 wherein distribution ready indication 372 does not indicate that stored consumer video 166 is ready to be distributed anytime. In one embodiment, video server 253 does not receive distribution ready indication 372 from video receiver 251. In one embodiment, video server 253 informs consumer 110 that stored consumer video 166 is not ready for distribution anytime. In one embodiment, video server 253 displays a screen indicating that stored consumer video 166 is not available. In one embodiment, video server 253 displays a screen indicating that stored consumer video 166 will be available in a future time.

In one embodiment video server 253 determines that stored consumer video 166 is ready to be distributed anytime based on distribution ready indication 372. In one embodiment, stored consumer video 166 includes distribution ready indication 372 wherein distribution ready indication 372 indicates that stored consumer video 166 is ready to be distributed anytime. In one embodiment, video server 253 receives distribution ready indication 372 from video receiver 251.

Video server 253 retrieve stored consumer video 166 from consumer datastore 107 and distributes stored consumer video 166 to television set 113.

Video server 253 retrieves a sequence of media data in stored consumer video 166 and transmits the retrieved sequence of media data onto television channel 105 over television network 255. In one embodiment, video server 253 retrieves media data 461, and converts media data 461 into television signal 471. Video server 253 transmits television signal 471 onto television channel 105.

Television set 113 receives television signal 471 from television channel 105. Television set 113 processes and displays television signal 471.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for providing an online video service, comprising:
   (a) receiving a pick-up ticket from a consumer by an online portal over a first communication session established between the consumer and the online portal over Internet, the pick-up ticket provided to the consumer by a video merchant, the pick-up ticket comprising a merchant identity and a video identity associated with a completed video purchase transaction between the consumer and the video merchant;
   (b) connecting to the video merchant by the online portal using the merchant identity in the pick-up ticket;
   (c) providing to the video merchant the video identity in the pick-up ticket by the online portal;

(d) storing the video associated with the video identity in the consumer datastore at the online portal, wherein the consumer datastore is associated with a consumer identity for the consumer;
(e) determining, by the online portal, that missing media data in the stored video is below a predetermined threshold;
(f) in response to determining that the missing media data in the stored video is below the predetermined threshold, storing a distribution ready indication with the stored video by the online portal;
(g) establishing a second communication session over a television network comprising the Internet, by the online portal, with a television set associated with the consumer identity;
(h) determining, by the online portal, that the video is ready to be distributed based on the distribution ready indication stored with the video;
(i) retrieving, by the online portal, the stored video from the consumer datastore associated with the consumer identity;
(j) instructing, by the online portal, the television set to tune to an Internet Protocol Television (IPTV) channel of the television set; and
(k) distributing television signals of the stored video by the online portal to the IPTV channel of the television set over the television network.

2. The method of claim 1, wherein the retrieving (i) comprises:
(i1) authenticating by the video server the consumer identity.

3. The method of claim 1, wherein the distributing (k) further comprises:
(k1) additionally distributing by the video server, over the second communication session, an advertisement different from the stored video.

4. The method of claim 1, wherein the distributing (k) comprises:
(k1) streaming by the video server, over the television network, the television signals of the stored video to the IPTV channel of the television set associated with the consumer identity.

5. The method of claim 1, wherein the storing (d) further comprises:
(d1) storing by the online portal a sequence of media signals as the stored video.

6. The method of claim 1, wherein the distributing (k) further comprises:
(k1) determining by a video server that the video is not ready for distribution based on an amount of video data stored for the video; and
(k2) informing a consumer of the video that the video is not ready for distribution.

7. A system, comprising:
an online portal for:
receiving a pick-up ticket from a consumer by the online portal over a first communication session established between the consumer and the online portal over Internet, the pick-up ticket provided to the consumer by a video merchant, the pick-up ticket comprising a merchant identity and a video identity associated with a completed video purchase transaction between the consumer and the video merchant;
connecting to the video merchant by the online portal using the merchant identity in the pick-up ticket;
providing to the video merchant the video identity in the pick-up ticket by the online portal; and
storing the video associated with the video identity in the consumer datastore at the online portal, wherein the consumer datastore is associated with a consumer identity for the consumer;
determining that missing media data in the stored video is below a predetermined threshold; and
in response to determining that the missing media data in the stored video is below the predetermined threshold, storing a distribution ready indication with the stored video;
the consumer datastore comprising the stored video; and
a video server at the online portal for establishing a second communication session over a television network comprising the Internet with a television set associated with the consumer identity, determining that the video is ready to be distributed based on the distribution ready indication stored with the video, retrieving the stored video from the consumer datastore associated with the consumer identity, instructing the television set to tune to an Internet Protocol Television (IPTV) channel of the television set, and distributing television signals of the stored video to the IPTV channel of the television set.

8. The system of claim 7, wherein in retrieving the stored video, the video server authenticates the consumer identity.

9. The system of claim 7, wherein in distributing the stored video, the video server additionally distributes, over the second communication session, an advertisement different from the stored video.

10. The system of claim 7, wherein in distributing the stored video, the video server streams, over the television network, the television signals of the stored video to the IPTV channel of the television set associated with the consumer identity.

11. The system of claim 7, wherein the storing the video, the online portal stores a sequence of media signals as the stored video.

12. The system of claim 7, wherein in distributing the stored video, the video server:
determines that the video is not ready for distribution based on an amount of video data stored for the video; and
informs a consumer of the video that the video is not ready for distribution.

13. A non-transitory computer readable medium with program instructions for providing an online video service, comprising instructions for:
(a) receiving a pick-up ticket from a consumer by an online portal over a first communication session established between the consumer and the online portal over Internet, the pick-up ticket provided to the consumer by a video merchant, the pick-up ticket comprising a merchant identity and a video identity associated with a completed video purchase transaction between the consumer and the video merchant;
(b) connecting to the video merchant by the online portal using the merchant identity in the pick-up ticket;
(c) providing to the video merchant the video identity in the pick-up ticket by the online portal;
(d) storing the video associated with the video identity in the consumer datastore at the online portal, wherein the consumer datastore is associated with a consumer identity for the consumer;
(e) determining that missing media data in the stored video is below a predetermined threshold;

(f) in response to determining that the missing media data in the stored video is below the predetermined threshold, storing a distribution ready indication with the stored video;

(g) establishing a second communication session over a television network comprising the Internet, by the online portal, with a television set associated with the consumer identity;

(h) determining, by the online portal, that the video is ready to be distributed based on the distribution ready indication stored with the video;

(i) retrieving, by the online portal, the stored video from the consumer datastore associated with the consumer identity;

(j) instructing, by the online portal, the television set to tune to an Internet Protocol Television (IPTV) channel of the television set; and (k) distributing television signals of the stored video by the online portal to the IPTV channel of the television set over the television network.

14. The medium of claim 13, wherein the retrieving (i) comprises:
  (i1) authenticating by the video server the consumer identity.

15. The medium of claim 13, wherein the distributing (k) further comprises:
  (k1) additionally distributing by the video server, over the second communication session, an advertisement different from the stored video.

16. The medium of claim 13, wherein the distributing (k) comprises:
  (k1) streaming by the video server, over the television network, the television signals of the stored video to the IPTV channel of the television set associated with the consumer identity.

17. The medium of claim 13, wherein the storing (d) further comprises:
  (d1) storing by the online portal a sequence of media signals as the stored video.

18. The medium of claim 13, wherein the distributing (k) further comprises:
  (k1) determining by a video server that the video is not ready for distribution based on an amount of video data stored for the video; and
  (k2) informing a consumer of the video that the video is not ready for distribution.

19. The method of claim 1, wherein the video identity is associated with a video purchase transaction record for the consumer's completed purchase of the video from the video merchant.

20. The system of claim 7, wherein the video identity is associated with a video purchase transaction record for the consumer's completed purchase of the video from the video merchant.

21. The medium of claim 13, wherein the video identity is associated with a video purchase transaction record for the consumer's completed purchase of the video from the video merchant.

* * * * *